United States Patent [19]

Dougherty

[11] Patent Number: 4,602,343

[45] Date of Patent: Jul. 22, 1986

[54] SUPERVISORY AND CONTROL SYSTEM HAVING DYNAMIC SIGNIFICANT CHANGE OF VALUES

[75] Inventor: Roderick J. Dougherty, Oak Park, Ill.

[73] Assignee: MCC Powers, Skokie, Ill.

[21] Appl. No.: 359,697

[22] Filed: Mar. 19, 1982

[51] Int. Cl.[4] .......................... G06F 15/20; G06G 7/68
[52] U.S. Cl. ..................................... 364/505; 364/418; 364/551
[58] Field of Search ............... 364/418, 505, 506, 550, 364/557, 464, 483, 492, 493, 552, 554, 154, 179, 571, 575, 580; 165/11 R, 13, 22; 375/25, 27, 33

[56] References Cited

U.S. PATENT DOCUMENTS

| | | | |
|---|---|---|---|
| 3,621,397 | 11/1971 | Kanagawa et al. | 375/25 |
| 3,699,446 | 10/1972 | Sainte-Beuve | 375/25 |
| 3,758,757 | 9/1973 | Buhler et al. | 364/719 |
| 3,761,613 | 9/1973 | Limb | 375/25 |
| 3,876,872 | 4/1975 | Spitz | 364/154 |
| 4,090,248 | 5/1978 | Swanson et al. | 165/22 |
| 4,107,610 | 8/1978 | Weber | 375/27 |
| 4,123,796 | 10/1978 | Shih | 165/22 |
| 4,130,729 | 12/1978 | Gagnon | 375/27 |
| 4,142,184 | 2/1979 | Lake | 375/25 |
| 4,153,936 | 5/1979 | Schmitz et al. | 364/493 |
| 4,251,804 | 2/1981 | Scardina et al. | 375/27 |
| 4,306,293 | 12/1981 | Marathe | 364/557 |
| 4,320,463 | 3/1982 | Himmelstein | 364/552 |
| 4,332,013 | 5/1982 | Chelcun et al. | 364/418 |
| 4,382,284 | 5/1983 | Dressel et al. | 364/418 |
| 4,393,371 | 9/1983 | Morgan-Smith | 340/347 M |

Primary Examiner—James D. Thomas
Assistant Examiner—Dale M. Shaw
Attorney, Agent, or Firm—Welsh & Katz, Ltd.

[57] ABSTRACT

Communications methods and apparatus are disclosed for multiple subsystem intercommunication for supervisory and control systems such as can be found in heating, air conditioning, energy control and other environmental control equipment that are installed in buildings and the like. The present invention provides an improved system which includes improved distribution means wherein data from individual distribution panels is discriminantly transmitted to the host computer as a function of the present sampled data and the data previously transmitted, preferably wherein the present rate of data transmission to the host computer is determined as a function of the previous rate of transmission.

The present invention provides distribution means wherein the characterization or definition of the specific function operations that are to be performed by individual control point apparatus can be carried out by instructions that are provided by an operator from a central or host computer.

A distribution means is provided whereby the present rate of data transmission from a remote unit to a host computer may be selectively determined as a function of the previous rate of transmission from that remote unit, and may also be determined as a function of the rate of communication (bandwidth) of communication to the host unit from the remote units. Means are provided for adapting change of value band limits which must be exceeded for transmission of an information signal (corresponding to the sampled data signal) to be output from a remote unit to the host unit. Additionally, means are provided for adjusting the change of value discriminant band limits as a function of the sampled data signal.

49 Claims, 13 Drawing Figures

X = TxMT (TRANSMISSIONS)
D = K = CONSTANT
TxMT = f(V(t), D)

Fig. 3.

$D \propto f(v((TxMT)n)), f(v,t), f(v(t), v(t-1)), f(v(t(TxMT)n+), f(\frac{d\,TxMT}{dt})$ $TxMT = f(D, v(t), t)$

SUPERVISORY AND CONTROL SYSTEM HAVING DYNAMIC SIGNIFICANT CHANGE OF VALUES

The present invention generally relates to supervisory and control systems, and more particularly, to communications methods and apparatus for multiple subsystem intercommunication such as can be found in heating, air conditioning, energy control and other environmental control equipment that are installed in buildings and the like.

There is a continuing effort to improve and refine systems which efficiently monitor and control the environmental and temperature control equipment in buildings and the like. There is also a continuing effort in controlling such heating, ventilating and air conditioning equipment in a manner whereby operating efficiency in terms of energy consumption is maximized and maintenance labor costs are minimized through the use of automation and computer control. It is desirable to have a system wherein the field located distribution panels can be relatively uniform from a standpoint of physical hardware and yet have a diversity of functions which can be performed by unique characterization of the various types of functions that are performed in the various distribution panels. When the specific characterization operations are effectively removed from the responsibility of the technicians that are installing the equipment in the building or the like, there is less likelihood of incurring increased labor costs caused by incorrect characterization, incorrect placement of various types of circuitry or circuit components, as well as lost time experienced by the field personnel in attempting to analyze and perform the type of characterization that may be required. The use of a fixed discriminant value, as disclosed in Chelcun et al., U.S. Pat. No. 4,332,013, provided a minimum significant change in value requirement for data transmission. This improved bandwidth by eliminating purely periodic time transmissions. Where a plurality of distribution panels are coupled to a host computer via a fixed bandwidth communications channel, channel activity can exceed the fixed bandwidth, and data from some distribution panels may be lost or delayed.

Accordingly, it is an object of the present invention to provide an improved system of the foregoing type which specifically includes improved distribution means wherein the data from individual distribution panels is discriminantly transmitted to the host computer as a function of the present sampled data and the data previously transmitted.

It is yet another general object of the present invention to provide distribution means for use in a system of the foregoing type wherein the characterization or definition of the specific function operations that are to be performed by individual control point apparatus can be carried out by instructions that are provided by an operator from a central or host computer.

Still another general object of the present invention is to provide a distribution means in a system of the foregoing type wherein the present rate of data transmission to the host computer is determined as a function of the previous rate of transmission.

Other objects and advantages of the present invention will become apparent upon reading the following detailed description, while referring to the attached drawings, in which.

In accordance with the present invention, illustrative embodiments of signal transmission systems are described herein. Each system provides a distribution means whereby the present rate of data transmission from a remote unit to a host computer may be selectively determined as a function of the previous rate of transmission from that remote unit, and may also be determined as a function of the rate of communication (bandwidth) to the host unit from the remote units. Means are provided for adapting change of value band limits which must be exceeded for transmission of an information signal (corresponding to the sampled data signal) to be output from a remote unit to the host unit. Additionally, means are provided for adjusting the change of value discriminant band limits as a function of the magnitude, a statistical characterization value, or a domain characterization value of the sampled data signal. Furthermore, the transmitted information signal may represent a function of the sampled data signal, such as magnitude, a statistical function, or a domain function. Finally, means are illustrated and disclosed for implementing embodiments of the present invention in discrete logic circuitry, as well as a hybrid hardware/software processor based embodiment.

Figure 1:
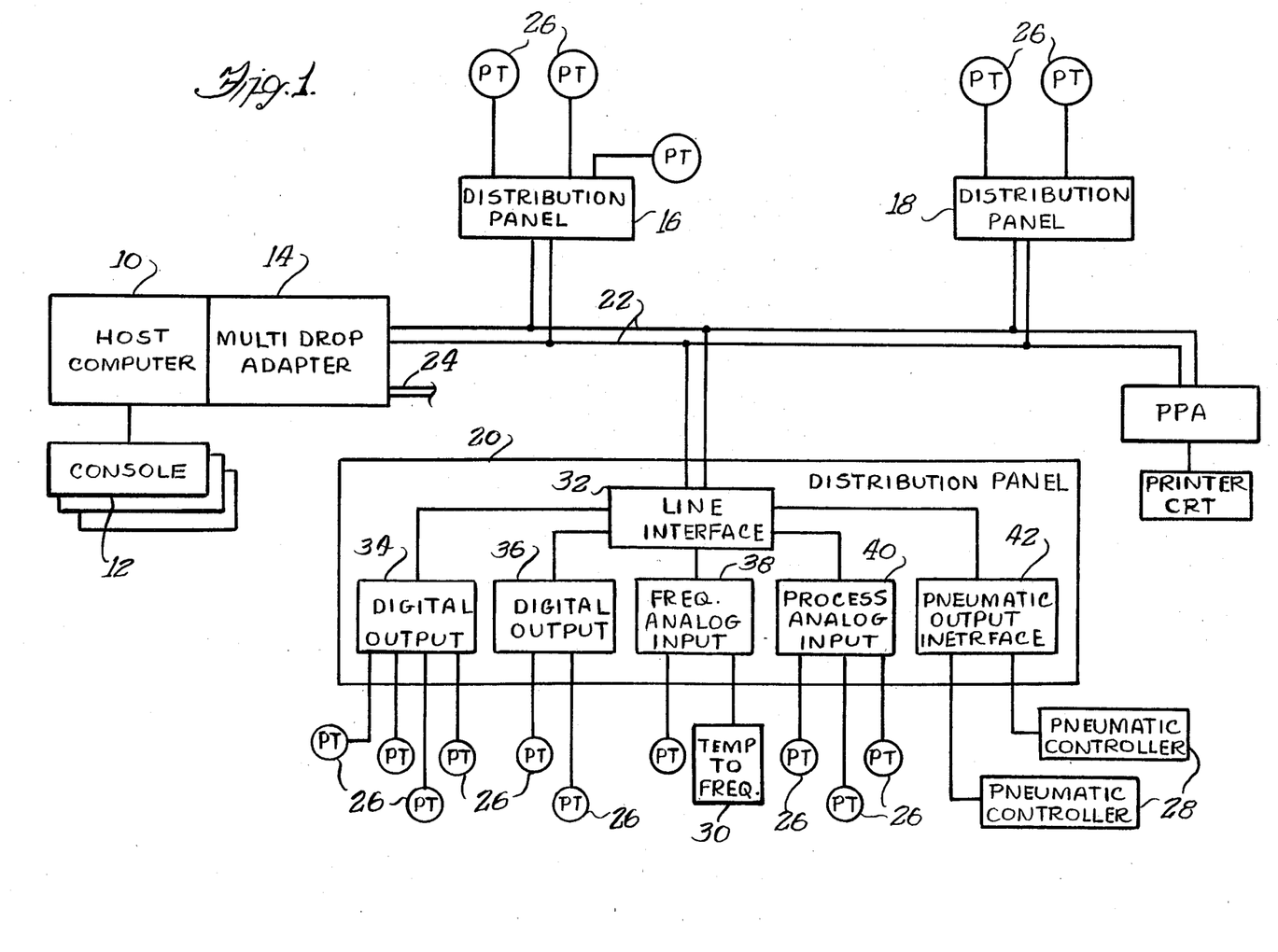
FIG. 1 is a block diagram of the overall system embodying the present invention.

A generalized system with which an embodiment of the present invention may be utilized is described in FIG. 1, detailing the general and specific functions and protocols of such a system. Particular embodiments of the present invention are then discussed with reference to FIGS. 2–11.

Referring to FIG. 1, a block diagram of apparatus embodying the present invention is shown together with a central control computer which may include a general operating console which maintenance or operating personnel utilize to supervise and control the operation of heating, ventilating, and air conditioning equipment, as well as other environmental control apparatus that may be a part of the physical plant of a building. As was alluded to herein, there is an increasing tendency to incorporate supervisory and control systems (also referred to as automated control systems) in buildings that are smaller than what had previously been regarded as the size of buildings that were economically cost-justifiable in terms of providing such sophisticated control. Because of the ever increasing cost of energy and of maintenance or building engineers, the incorporation of supervisory and control systems that are computer controlled or computer assisted continues to proliferate. Moreover, if a series of building in one general location are controlled, i.e., a college campus or a school system comprised of several buildings, a single computer based system may be used to reduce energy and labor costs.

The basic configuration of the system embodying the present invention has a central control computer 10 that is connected to a console or consoles 12, which can be real and/or virtual, and to circuitry identified as a multi-drop adaptor 14 which is connected to one or more distribution panels 16, 18 and 20 by means of a communication trunk 22, such as a two wire link, multiwire link, or radio frequency link. The central control computer is preferably a type PDP 11 computer, Model No. 11/34 as manufactured by the Digital Equipment Company of Maynard, Mass. However, the computer can also be any Digital Equipment Company CPU that operates using the RXS 11/M real time operating system. Alternatively, other CPU's may be used if appropriately programmed. The multi-drop adaptor 14 may have additional trunks such as trunk 24 which extends to other distribution panels in a similar fashion. The distribution panels are in turn interconnected with control point apparatus that may perform many diverse functions, such as either acquiring information or controlling equipment, based upon commands that are provided to the control point apparatus. In this regard, it should be appreciated that such control point apparatus may carry out data acquisition functions such as sensing temperature, humidity, the state of an electrical contact in a relay, motor starter or the like, as well as the position of a rotary shaft as may be employed in a damper controller and the like. On the other hand, the control point apparatus may be used to implement commands from the central control computer and as such may control a damper motor for effecting a change in the volume of air that is moving through a duct, starting or stopping electrical motors of heating and air conditioning equipment, effecting a change in the pressure of a pneumatic control line and the like. Thus, the distribution panels 16, 18 and 20 broadly interconnect the control point apparatus 26 with the distribution panel which in turn communicates with the central computer 10 via the two wire communication channel trunk 22. In addition to the control point apparatus that are identified by the number 26, other particular control point apparatus may be included, such as a pressure to frequency converter 28 and a temperature to frequency converter 30.

The distribution panels, such as panel 20, perform input and output functions and the communications trunk 22 is connected to a line interfacing means 32 which in turn communicates with various categories of function means which can be one of five different types or categories of function or operation. More particularly, each distribution panel may have one or more of each of these categories of function means which can include a digital output function means 34, a digital input function means 36, a frequency analog input function means 38, a signal level or process analog input function means 40, a pneumatic output interface function means 42 and a process analog output (4–20 mA, or 1–5 V, for example). Each of these function means is preferably fabricated of a printed circuit board with electrical components and integrated circuit chips attached to it, and the function means is preferably releasably connectable to a larger printed circuit board, hereafter referred to as a "mother" board and the line interfacing means 32 is also perferably releasably connected to the mother board in a similar manner.

Virtually all of the functions that are performed by the control point apparatus in the systems of the present invention can be performed by the five different categories of function means, each of which can be inserted into the mother board of the distribution panel as required by the control point apparatus that is located in the vicinity of the particular distribution panel 20. The mother board is also adapted to receive more than one of a particular category of function means and a particular panel may not have all five categories of function means therein. Of particular significance is the fact that each category of function means is uniform in its design and construction and requires no modification by field personnel for its operation. Only the line interfacing means requires minimal field manipulation to set a unique address code in the circuitry which may be easily done by manipulating a six bit binary switch or the like. One of the significant and desirable aspects of the present invention is the fact that each of the various categories of function means can operate in different functional manners with respect to each control point apparatus that is operatively connected to it.

The individualization or characterization of the function means controlling each control point apparatus is done by specific commands that are carried out by an operator at the console 12 through the use of the central control computer 10 and such characterization or down line loading of the function means can be easily carried out when the particular category of function means is inserted into the mother board, either originally or upon replacement of a malfunctioning function means. This aspect of the system of the present invention is also desirable in that the manner in which a particular function means controls a particular control point apparatus can be changed by an operator via the console and central control computer as desired. Additionally, critical values for set points and the like can also be easily changed in the same manner, as is necessary. The characterization is accomplished without performing any manual operation or structural switching or the like at the location of the distribution panel.

Each of the categories of function means as well as the interfacing means 32 has as a component thereof a processing means, such as a microprocessor, microcomputer, discrete logic, or other processing means, which includes memory into which status and other information is stored. The processing means and memory means also receives information regarding the characterization that is performed with respect to each of the control point apparatus. The various types of messages that are received and transmitted among the function means, the interfacing means and the central control computer is governed by communication protocol that will now be broadly described. The information must be exchanged between the central control computer and the various distribution panels over one or more serial data paths such as the trunk 22 and the protocol used to accomplish the exchange of information is by way of a master polling the slave on the serial trunk. The central control computer sends a command message and expects to receive a response message within a very short time. The communication protocol from the central control computer to the interfacing means 32 is one wherein the messages are sent in units of bytes with each byte consisting of a start bit, eight data bits, with the least significant bit appearing first, and a stop bit. The messages consist of one byte message synchronization character, a one byte count of the number of bytes that are remaining in the rest of the message, a one byte address for the particular distribution panel that the message is to be addressed to, a 1 to 252 byte data field and a two byte field containing a cyclic redundancy check number with the low order byte appearing first. The maximum number of data bytes in the messages is restricted by the eight bit count byte and the minimum number of data bytes should be one since there is no reason to send no data. With respect to the communication protocol within the distribution panel, there is a need to exchange information between the interfacing means and the function means over a byte serial communication link and this communication link runs across the previously mentioned mother board backplane. It preferably consists of eight bidirectional data lines, two unidirectional hand-shaking lines which comprise an interfacing means ready signal (LCRDY) that is sent to the function means, a function means ready signal (FCRDY) that is sent to the interfacing means, and one additional address line from the interfacing means to each of the function means. The interfacing means is the master and it polls each function means for information by sending a command to the function means which executes it and returns an appropriate message to the interfacing means. It is preferred that on byte every 200 microseconds is the maximum transfer rate and a command message for setting a digital output function means control point apparatus would pass eight bytes of data between the interfacing means and the digital output function means and would take only about 2.3 milliseconds. It is preferred that the message from the interfacing means to one of the function means comprises three fields with the first field having a one byte count of the bytes remaining to be sent, the second field containing the data to be exchanged and the last field providing a check sum.

In terms of the sequence of events that occur, in the event the interfacing means starts the communication sequence, it puts the count byte on the data bus and sets its hand-shake line (LCRDY) active and selects the appropriate or target function means which causes an external interrupt to occur in that function means. Upon selection, the function means saves its current state and devotes its resources to communicating with the interfacing means. The function means reads the data bus, resets its ready line (FCRDY) and then watches the interfacing means ready line (LCRDY). The interfacing means sees the function means hand-shake line change, puts the next byte of data on the bus and also changes the state of its hand-shaking line. When the function means reads the last byte of the command message it sends an acknowledge by way of the ready line (FCRDY) and waits for the interfacing means ready line (LCRDY) to change, indicating bus turnaround.

When the interfacing means sees the acknowledge signal it again turns the bus around to receive and it switches its ready line active (LCRDY). After the function means sees the interfacing means ready line change indicating the bus has turned around, it puts the count of its response message on the bus, turns the bus to transmit and switches its function card ready line active (FCRDY). The interfacing means picks up a byte of the message off of the bus and switches its ready line (LCRDY) each time it sees the function card ready line (FCRDY) change, until all bytes are transferred. The interfacing means holds the acknowledgement of the check sum on the bus for ½ millisecond and then deselects the bus. The function means then returns from the external interrupt as soon as it sees the interfacing means acknowledge the check sum byte.

The protocol for the central control computer communicating with a particular distribution panel is also eight bit byte oriented with the central control computer sending a command to individual distribution panels which executes them and returns a response to the central computer. Each panel must be individually accessed and host commands also consist of three fields. The commands comprise one byte of command field, one byte of address field which preferably has the high order four bits indicating the particular slot address in the distribution panel and the lower order four bits representing the particular control point apparatus address. It should be apparent that for some commands, only the function means address is significant. The interfacing means knows which function means to select from the slot address and knows from the response of the function means whether a particular function means occupies more than one slot in the mother board. The data field for a central computer command is of variable length depending upon the command and the low order byte of any multi-byte field is transmitted first.

The response from a distribution panel may contain one or more fields depending upon the command from the central control computer. The first field of the response message is an error indication field which, if the command was correctly received and executed by the distribution panel, will contain an acknowledgement in one byte. However, if there is some error detected in the command, a field containing a one byte negative acknowledgement followed by another byte containing an error code will be transmitted. Possible errors may include information that the function means needs to be characterized, that the command is invalid or that there is no change of status information in the distribution panel. When the central control computer requests change of values in the control point apparatus that sends such information, it will provide a command to the interfacing means 32 requesting such change of value information and the interfacing means will respond with an error indication field and one or more three byte entries in the data field. The first byte will be the control point apparatus address and the other two bytes are the associated data with the low order byte appearing first. If the high order bit of the control point apparatus address is set, the data for the point is not defined as change of value information but is an indication of some other condition being recorded, such as a function means failure or that a pneumatic output interface cannot control an associated control point apparatus, for example. The specific error code is contained in the succeeding two bytes of data.

Broadly stated, the various commands provide complete control of the function means in the distribution panel and each category of function means can be appropriately characterized. Function means which provide input signals may be enabled or disabled for change of value recording and significant change of value limits may be set for each analog input, whether it be a frequency analog input control means 38 or a process analog input function means 40, as well as a pulse accumulator point which is a particular characterization of the digital input function means 36 and which will be hereinafter described. Function means which provide input data may be read and function means which provide output signals may be written into the memory of the processing means associated with the function means. It is preferred that up to 83 changes of status in a distribution panel may be returned to the central control computer as a result of a single command. If the central control computer receives a garbled response from a distribution panel it can have the distribution panel repeat its last response and avoid sending redundant commands to a control point apparatus.

Function means also respond to other commands which are generated by the interfacing means 32. For example, at power up initialization, the interfacing means sends a "who-are-you" command to each slot in which a function means printed circuit board can be connected, requesting what category of function means is present. The interfacing means will also report the failure of a function means to the central computer once as a change of value and after the central control computer acknowledges the change of value the interfacing means will continually select failed function means to see if they have returned. The first instance the central control computer checks for a change of value after the function means returns to operation, the function means will make a characterization request. Until the central control computer characterizes a single control point apparatus on a function means, the function means will request characterization in response to every change of value request the central computer makes of the particular distribution panel.

To summarize, the central control computer communicates with each function means and with the interfacing means in a distribution panel and the interfacing means often merely passes information between the central control computer and the function means. Some commands go from the central control computer to the interfacing means and some go from the central computer to a function means and finally some commands go from the interfacing means to a function means. The details of a protocol that is used to characterize specific categories of function means as well as to amplify on the protocol as it relates to the interfacing means is set forth in the aforementioned U.S. Pat. No. 4,332,013, assigned to the same Assignee as the present Application, which is hereby incorporated herein by reference.

The function means are very flexible in terms of the diverse functional operations that can be carried out by each of them, depending upon the individual characterization that is performed with respect to each control point apparatus associated with the function means.

Turning initially to the digital output function means 34, each of the outputs that are connected to a control point apparatus 26 can be individually characterized as to whether it is a pulsed output or a level signal output. Thus, if a particular output is individualized or characterized by an operator at the console 12 utilizing the central control computer 10, the output command to the particular output that is provided by the digital output function means 36 can be a pulse for triggering electric motor controllers or the like which require a momentary contact pulse to switch them on or off, or it can be a level state, i.e., a high or low voltage signal. Moreover, a simple command from the console 12 can change the characterization of the digital output function means with respect to each of the individual points and can change a pulse output to a level state output as well as change a level state output to a pulse state output. The digital output function means is characterized using the above-mentioned protocol wherein the characterization information comprises one byte of command, one byte of point address and one byte for characterizing pulsed or level states with bit zero being set for a pulsed control point apparatus and reset for a latched point. Once the particular control point is characterized as a pulsed output, then a pulse is sent as a logical 1. The digital output function means must be provided with a logical 1 from the central control computer in order for the point to issue a pulse output.

Turning now to the digital input function means 36, it has the capability of being characterized to function either as a pure digital input with respect to any of the control point apparatus that is operatively associated with it or it can be characterized to function as a pulse accumulator. As a pulse accumulator it functions as a counter. If a control point apparatus is characterized as a pulse accumulator, then it may be characterized to provide reporting for change of value reporting when enabled, it may also be enabled to provide only significant change of value reporting if desired and it may also be characterized to provide adaptable (adjustable discriminant) significant change of value reporting. To characterize the digital input means, the characterization commands include a multi-byte command sequence.

Referring now to the analog input function means, both the frequency analog input function means 38 and the proces analog input function means 40, have the same basic operation as far as characterization commands and the like that are carried out are concerned and they can therefore be described together and referred to as analog input function means. The only difference between the two is that the frequency analog input function means has an input signal applied thereto from a control point apparatus that has the analog value converted to a signal of particular frequency by an appropriate converting means which converts the condition sensed to a frequency variable signal. In this regard, a temperature to frequency converter 30 converts a sensed temperature to a variable frequency signal. The process analog input function means 40 receives from the control point apparatus an analog input signal wherein the current level varies within a predetermined range as opposed to a variable frequency input signal.

The analog input function means can be characterized with respect to each control point apparatus that is operatively connected thereto to be enabled for change of value reporting so that it will report to the central control computer when enabled for any change in the analog value of the particular control point apparatus. It can also be disabled from change of value reporting if desired, whereupon the change of value is stored in memory and is transmitted only when a change of value request is made. It may also be characterized to provide adaptable (adjustable discriminant) significant change of value reporting. However, an operator can request the value of any point by operating the console to obtain the reading even though the point is disabled from change of value reporting. The analog input function means can also be characterized to operate for significant change of value, being individually defined or specified for each of the control point apparatus. If the value of the input changes only minimally, i.e., no greater than the amount of change that is defined for that control point apparatus, then any lesser amount of change will not be reported to the central control computer. However, if the amount of change in the input exceeds the defined deviation and therefore becomes a significant change of value, then it will be transmitted to the central control computer. With adaptable (adjustable discriminant) significant change of value reporting, the band limit threshold for reporting (discriminant) is varied according and responsive to the past information transmission values and/or the time since the last transmission, and the present sampled data value, and/or based on otherwise derived discriminant and band limit values. Thus, reporting activity is minimized, reducing the required bandwidth of the communications channel from remotes to host, and maintaining approximately the same level of usable intelligence data reported.

In terms of commands that are needed to characterize the analog input function means, each control point apparatus is characterized with a multiple byte command sequence.

To reset the significant change of value data an operator can enter a new value for the particular control point apparatus significant change of value number by addressing the control point with a multi-byte command sequence. To enable or disable a control point apparatus from change of value reporting, a multi byte command sequence is sent. When the central control computer requests a reading of the analog input values of a particular distribution panel, the panel will respond by sending a multi-byte acknowledge sequence. While the inputs discussed thus far have been real, virtual analog inputs and outputs can also exist in the system, such as a virtual analog input derived as a function of real inputs.

The pneumatic output interface function means 42 is, in a sense, the most functionally flexible of the various function means because it can be characterized essentially as an input device or as an output device. More particularly, it can be characterized as a controller in that it can be enabled or disabled for control of a pneumatically controlled damper motor or the like or a local controller wherein a piston arrangement for controlling a control valve or the like is controlled by supply air and the particular set point can be varied within the range of preferably 3 to 15 p.s.i. The pneumatic output interface can also be characterized as an input device which, when so characterized can be enabled for operation to provide adaptable or non adaptable change of value reporting, or not provide such change of value reporting when disabled. If it is enabled for a change of value reporting, it also can be characterized to provide adaptable or nonadaptable significant change of value reporting that is carried out by other of the function means having this functional capability. When characterized as an input device it may be connected to pressure to frequency converting circuitry 28 which is shown in FIG. 1. In terms of the protocol for characterizing the pneumatic output interface function means, it comprises a multi-byte command sequence. If significant change of value operation is to be carried out, there are two bytes of significant change of value and the significant bits can be defined in a manner best suited for the particular system application. If a set point is to be changed to a new value when the pneumatic output interface function means is characterized as a controller, the protocol for changing the value is carried out by a multiple byte command sequence.

While the foregoing provides a general description of the operation of the system of the present invention and also describes generally the protocol that is used to communicate among the various components of the system, including the central control computer means, the interfacing means and the various function means, the adaptable significant change of value reporting system embodiment of the present invention is shown in greater detail in FIGS. 2-11 which comprise graphs, electrical schematic circuit block diagrams, and flow charts for the various system embodiments of the invention.

Figure 2:
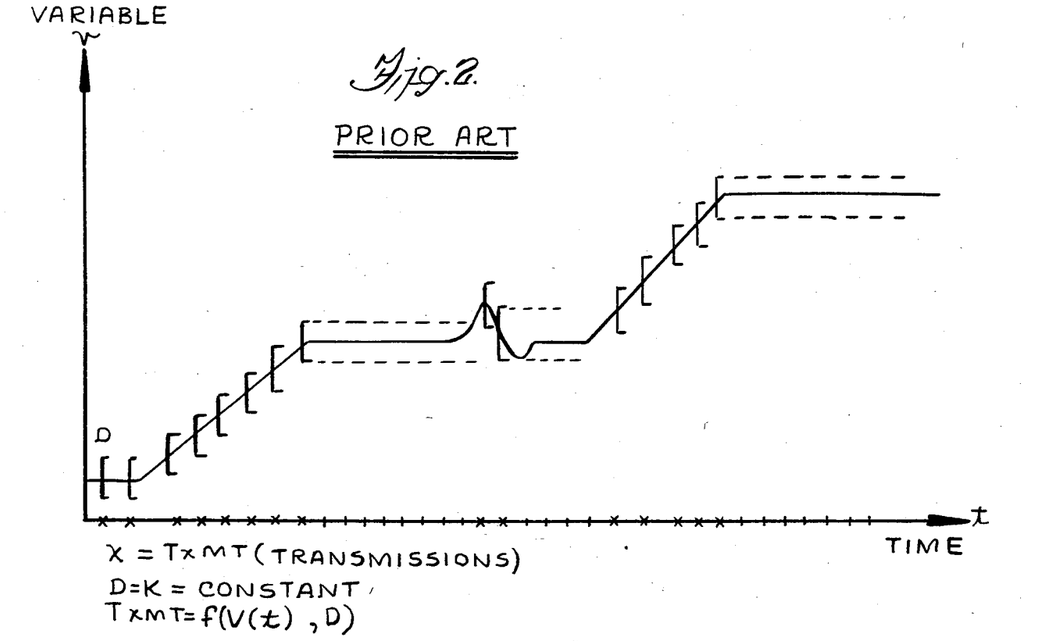
FIG. 2 is a graph plotting the value versus time relationship of transmission of an information signal, from the remote unit sampling data to the host, showing the prior art.

Referring to FIG. 2, a graph plotting the sampled value versus time, and showing transmission activity from the remote unit to the host unit based upon a constant value discriminant is shown. A system operating in accordance with this graph is described in co-pending application. As shown by the graph, X's correspond to times at which information signals are transmitted corresponding to the current time period sampled data signal value exceeding the discriminant band limit. As seen by reference to FIG. 2, the data value is sampled periodically, and transmission of an information signal corresponding to the sampled data signal for that time period is responsive to and a function of the value of the sampled signal at that time period (V[T]) and the discriminant value (D).

Figure 3:
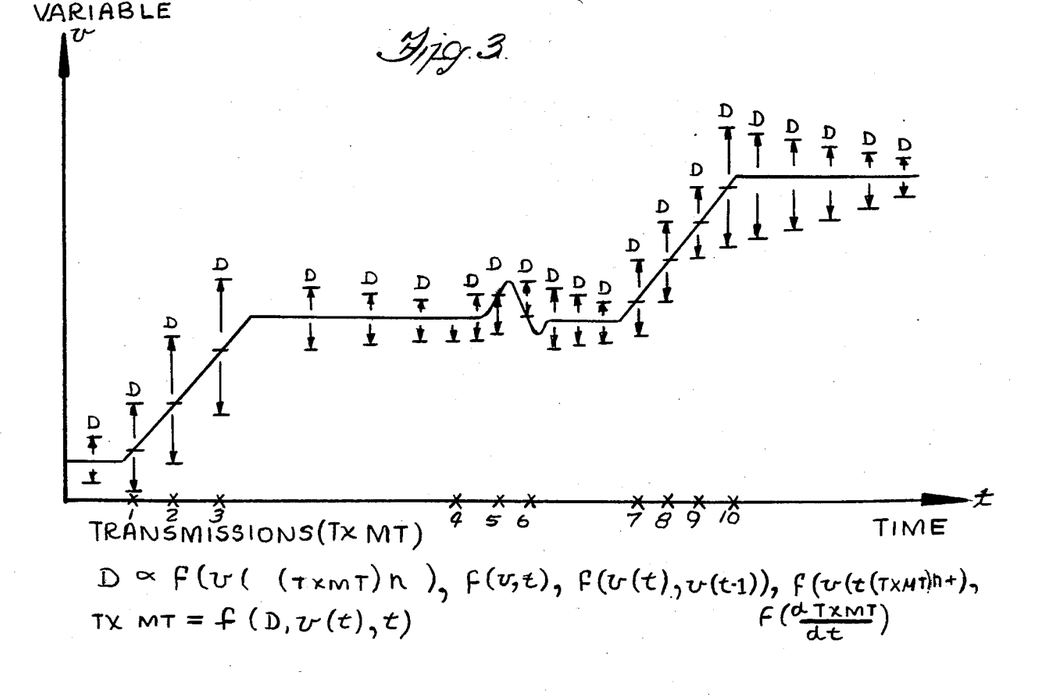
FIG. 3 is a graph plotting variable value versus time illustrating the adjustable discriminant control transmissions as embodied in the present invention.

Referring to FIG. 3, a graph is shown plotting the sampled variable (data signal) against time, illustrating the adaptable discriminant controlled transmissions denoted as X's on the graph. The variable data signal (V) is sampled periodically, and transmission of an information signal corresponding to the current time value of the sample data signal is responsive to and a function of the discriminant (D), the time value of the sample data signal at the present time (V[T]), and the elapsed time since the last transmission (T). The discriminant value (D) is determined responsive to the previously transmitted information signal (V[T[TXMT]N]), the current time period sampled data signal (V[T]) and the elapsed time since the prior information signal transmission (t[DTXMT]). The variable data signal is sampled at fixed intervals, with information transmission occuring only when the sampled data signal exceeds the discriminant value band limits. Initially, an initial value is assigned to the discriminant by the system. Thereafter, the discriminant value is self adapting, based upon the actual value of the sampled variable data signal, the value of the previously transmitted information signal, and the elapsed time since the last information signal transmittal. Additionally, the discriminant value may be adjusted (varied) responsive to the overall communications channel activity between the host and remote. As shown in FIG. 3 when a sampled data signal results in an information signal being transmitted, such as at times T1 to T11, the band limits determining the absolute size of the discriminant value are increased, thus requiring a greater change in signal value prior to transmittal of any further increase in the sampled signal value. It may also be seen from FIG. 3, that during sampling periods of the variable data signal following an information signal transmission, during which no further information signal is transmitted, the band limits of the discriminant are decreased so as to decrease the absolute discriminant band values, thus requiring less change in value of the variable data signal to effectuate transmission of an information signal representative of the sampled data signal. Thus, as the sampled data signal increases its rate of change, the discriminant value increases to decrease the transmission rate, while lack of transmission activity during sampling periods following an active transmission of an information signal results in reduction of the band limits of the discriminant value, decreasing the required rate of change the sampled variable signal prior to transmission of a corresponding information signal. Additionally, in one embodiment of the present invention, the discriminant value (band limits) is decreased if multiple (e.g. three) non-transmitting sampling time periods elapse.

Figure 4:
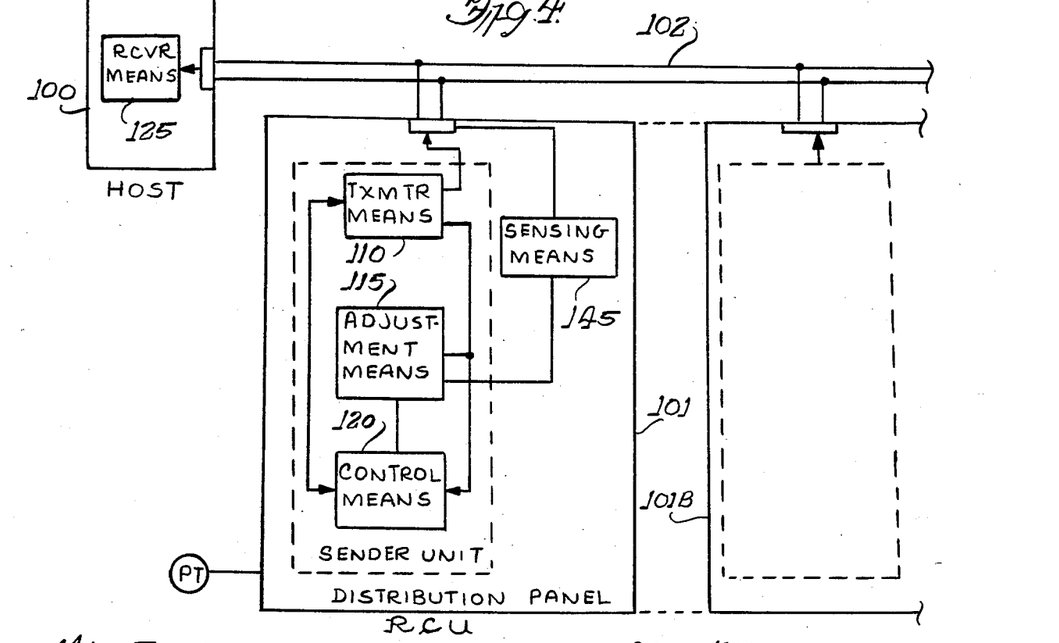
FIG. 4 is an electrical functions block diagram showing a remote unit and a host unit of a first embodiment of the present invention.

Referring to FIG. 4, a first embodiment of the present invention is shown comprising host unit 100 and remote unit 101 coupled to a communications channel 102. The host unit 100, remote units 101, and communications channel 102 form a signal transmission system. Each remote unit 101 is further comprised of transmitter means 110 for selectively time-slot transmitting a characterization value of a data signal responsive to a control stimulus. Time slot transmission refers to the correspondence of the transmitter means transmitting a characterization value between the periodic time sampling of the data signal. An adjustment means 115 provides a discriminant signal representing band limits, the value of the discriminant signal varying responsive to previous time slot transmissions of the characterization value of the data signal. The adjustment means 115 is operatively coupled to the transmitter means 110. A control means 120 compares a current time-slot value of said characterization value of said data signal to the value of the previously transmitted characterization value of the data signal, including means for selectively outputting the control stimulus when the differential of the compared signals is greater than the discriminant signal. The control means 120 is operatively coupled to the adjustment means 115, and transmitter means 110. The transmitter 110, adjustment means 115, and control means 120, together comprise a remote sending unit 101. A receiver, 125, remotely located with respect to the sender unit, selectively receives the characterization values of the data signal from one or more remote units 101. The receiver unit 125 is, in the illustrated embodiment, located within the host unit 100, located remotely with respect to the remote sending units 101.

Figure 5:
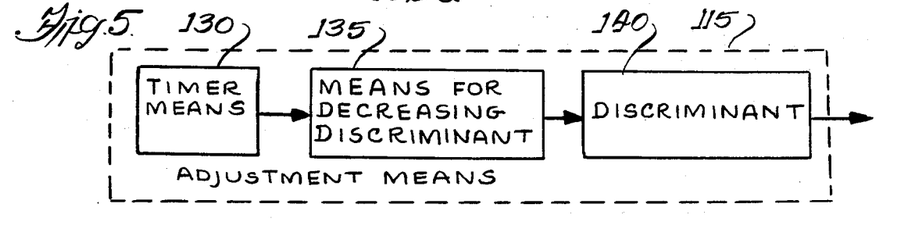
FIG. 5 is a detailed block diagram of the adjustment means of FIG. 4.

Referring to FIG. 5, a detailed block diagram of the adjustment means 115 of FIG. 4 is shown. The adjustment means is comprised of a timer 130 for counting time intervals between transmissions from the transmitter 110. The timer 130 may be implemented directly in digital logic, or may be implemented as a register or memory in a CPU based system, such as a microprocessor or microcomputer based system. A means 135 selectively decreases the discriminant signal value responsive to the timer 130 counting above a predefined threshold. Thus, where the elapsed time following a transmission exceeds the predefined threshold, the discriminant band limits are decreased.

Referring again to FIG. 4, the channel means 102 provides for the coupling of the characterization value from the transmitter 110 to the receiver 125. A means, 145, determines the time rate of transmissions through the channel means 102. The means for determining, 145, is operatively coupled to the adjustment means 115. The adjustment means 115 includes means for varying the discriminant signal value responsive to the means for determining 145. Thus, the value of the discriminant signal (band limits) may be increased or decreased independently, or interrelatedly, for each remote unit 101, responsive to the overall rate of transmission activity on the channel means 102.

Referring still to FIG. 4, a second remote sending unit 101b (identical to 101), is coupled to the channel means 102, and transmits characterization values of a second data signal. The means for determining, 145, determines the time rate of transmissions of characterization values of data signals from both the remote units 101 and 101b through the channel means 102.

The system of FIGS. 4 (and 5) is further characterized in that the characterization value which is transmitted may represent one or a mixture of functions of the sampled data signals. For example, the characterization value may be a function of the magnitude of the data signals, may be a statistical function of the sampled data signal, and/or may be a frequency domain or spectral domain function of the sampled data signal, and/or may be a convoluted summed function of the magnitude, statistical, and/or domain functions of the sampled data signal. The statistical function may represent any statistical information about the sampled data signal, such as the mean, mode, median, standard deviation, error squared, square root of error, root mean square, and/or Kalman filter statistical function. The domain function may be, for example, the frequency domain function, spectral domain function, or temporal domain function of the sampled data signal, or may be a combination of these.

In one embodiment of the system of FIG. 4, the remotely located receiver 125 controls the function selected for the characterization value. In another embodiment, each remote unit 101 controls its own selection of function for determining the characterization value. Thus, the host unit 100 may control the functional representation embodied in the characterization value from any or all selected remote units 101, or alternatively each remote unit may control its own function selection for the characterization value. In yet another embodiment, each remote unit 101 can selectively permute and combine functions for at least one data signal for transmission representing the characterization value Referring to FIG. 6, a block diagram of a second embodiment of the present invention is shown, illustrating a system having a data signal to be sampled. A means 150 samples the data signal at time intervals. In the illustrated embodiment, the time intervals are referenced to a clock signal from a clock source 155 which may be an integral part of the system or may be an externally provided signal. A means 160 determines the differential value of a previously transmitted data signal and the presently sampled data signal. The means 160 is coupled to the means 150 and to a band limit means 165. The means 165 determines a band limit signal value for each time interval responsive to the previous time interval differential value as coupled to the band limit means 165 from the differential means 160. A transmitter 170 is coupled to the means for sampling 150, differential means 160, and band limit means 165. The transmitter 170 provides for transmitting an information signal responsive to the present time interval differential value exceeding the then existing band limit signal. Thus, the transmitter means 170 is responsive to the output of the differential means 160, the band limit means 165, and the sampled data signal. The information signal 172 is output to a host computer system.

Figure 6:
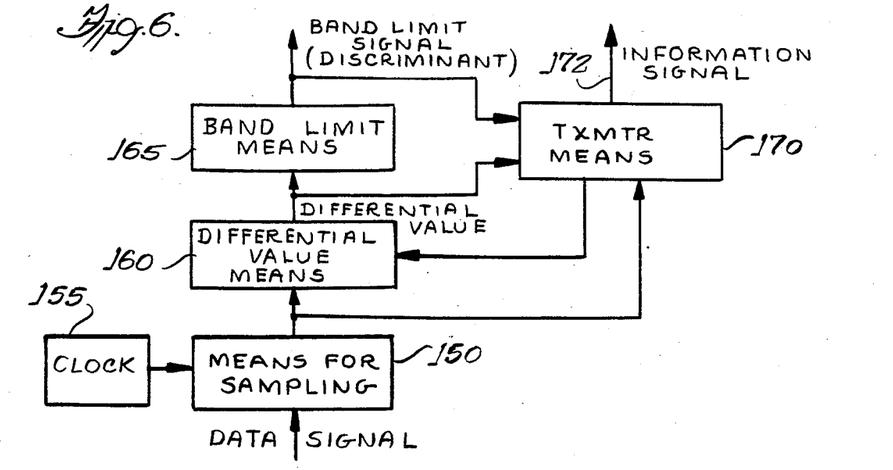
FIG. 6 is a block diagram of a second embodiment of the present invention.

In one embodiment shown in FIG. 6, the system is further comprised of means for changing the band limit signal responsive to the rate of transmission of the information signals for a predefined time period. Thus, if no information signal is output for a predefined number N of time intervals, the band limits will be reduced so that a smaller differential value (change in value) can activate the transmitter means and cause the transmission of an information signal.

In another embodiment of FIG. 6, the system is further comprised of means for changing the band limit signal responsive to the differential value of functional characterization values of the sampled data signals for successive time intervals. The functional characterization values may represent one of the mixture of functions of the sampled data as discussed with reference to FIGS. 4 and 5, such as magnitude, statistical or domain functions of the sampled data signal. Thus, the band limits which the differential value must exceed to actuate transmission of an information signal are adjusted responsive to the data signal being sampled, or to a function of the data signal being sampled.

In yet another embodiment of FIG. 6, the information signal 172 is output from the transmitter means 170 as a function of the data signal for the present time interval. The function may be one of the mixture of functions as discussed above.

Figure 7:
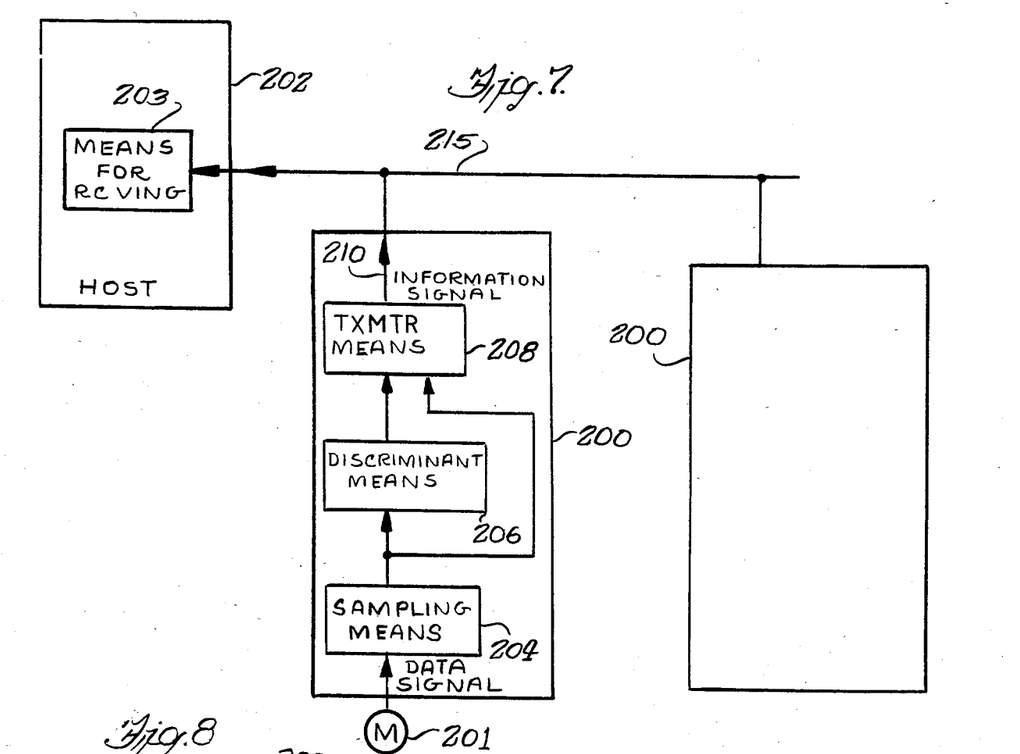
FIG. 7 is a block diagram of a multi processing system embodiment of the present invention.

Referring to FIG. 7, a block diagram of a multiprocessing system embodiment of the present invention is shown. A remote system 200 having a data signal to be sampled at a point 201 is comprised of a means 204 for sampling at time intervals the value of the data signal input at point 201. The sampling means 204 has an output coupled to a discriminant means 206. The means 206 determines a discriminant value responsive to successive time interval sampled values of the data signal and a previous time interval transmitted information signal. The output of the sampling means 204 and an output of the discriminant means 206 are coupled to a transmitter means 208. The means 208 selectively transmits an information signal 210 responsive to the present time interval data signal exceeding the discriminant value as output from the discriminant means 206. The information signal 210 is coupled to a bus means 215 for coupling the information signal 210 from the remote processor 200 to a host processor 202.

The system of FIG. 7 is further comprised of a plurality of the remote processors 200, each coupling an information signal 210 onto the bus means 215. The means 215 provides for commonly coupling the information signals from each of the remote processors 200 to the host processor 202. The host processor 202 includes means for receiving the information signal 203, and includes means for processing the received information signals, and means for communicating via response signals to selected ones of the remote processors 200.

In one embodiment of FIG. 7, each of the means 206 within the remote processor 200 is further comprised of means for comparing the magnitude values of the sampled data signals for at least two intervals. A magnitude differential for two different time intervals of sampled data signals must exceed a band limit prior to transmission of an information signal by the transmitter means 208. In another embodiment of FIG. 7, the discriminant means 206 is further comprised of means for comparing statistical characterization values of the sample data signals for at least two time intervals, and for providing a discriminant signal responsive thereto. Alternatively, the discriminant means 206 may be further comprised of means for comparing domain characteristic values of the sampled data signals for at least two time intervals, the discriminant means 206 outputting a discriminant signal responsive thereto. In a preferred embodiment of FIG. 7, the transmitter means 208 is further comprised of means for selectively enabling the transmission of the information signal 210 responsive to a chosen one of the means for comparing of the magnitude, statistical, or domain characterization values of the sampled data signal. Thus, the change of value required of the sampled data signal to actuate transmission of the information signal is made adaptable responsive to a selected characteristic function of the sampled data signal (e.g. magnitude, statistical, or domain characterization values).

Figure 8:
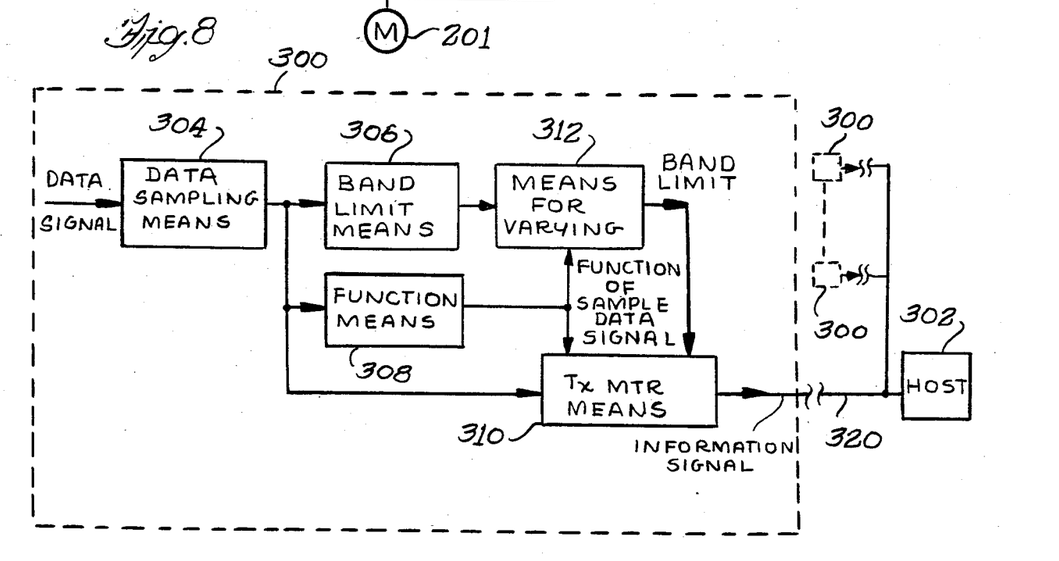
FIG. 8 is a block diagram of a fourth embodiment of the present invention.

Referring to FIG. 8, a block diagram of a fourth embodiment of the present invention is shown. A signal transmission system is shown as comprising a sending unit 300 and a host unit 302. The sending unit 300 is comprised of a data sampling means 304 for sampling a data signal input. The data sampling means 304 is coupled to a band limit means 306, a function means 308, and a transmitter means 310. The band limit means 306 provides band limits for the sampled signal. The band limits determine what is to be a "significant" change of value of the sampled data signal, a significant change of value being required to actuate transmission of an information signal responsive thereto. The band limit means is coupled to a means 312 for varying the band limit. The means 312 varies the size of the band limits responsive to a function of the signal being sampled. The function means 308 is coupled to the data sampling means 308, the means for varying 312 and to the transmitter means 310, and provides a signal output to the transmitter 310 which is a function of the sampled data signal. The means for varying 312 has an output coupled to the transmitter means 310. The transmitter means 310 selectively transmits an information signal which is a function of the sampled data signal value responsive to the band limits and to the sampled signal. The system further comprises means for varying the transmission and/or sampling rates of the sending unit 300 responsive to the data signal being sampled. The means for varying the rates may form an integral part of the transmitter means 310, or means for varying 312, or may be included as an independent element of the sending unit 300, or may be a function which is controlled by the host 302 to which the sending unit 300 is responsive. The function means 308 operates on the sampled data signal to provide an output which is a function of the sampled data signal. The function may be one of the mixture of functions, as discussed above, of the sampled data signal. A host system 302 receives the information signal output from the sending unit 300. The host 302 is coupled to the sending unit 300 via a communications channel 320 which provides for transferring to the host system 302 the transmitted information signals from the sending unit 300. In FIG. 8, the signal transmission system is comprised of a plurality of sending units 300, with the communications channel coupling each of the sending units 300 commonly to the host 302. The system is further comprised of means for varying the transmission rate of certain selected ones of the sending units 300 responsive to the overall rate of transmission activity on the communications channel 320. The means for varying the transmission rate can, for example, determine the rate of transmission activity on the communications channel by counting time intervals between communications from the host 302 to a particular remote sending unit 300 such as in a preferred embodiment where the host 302 polls the sending units 300 (as in an event driven system).

Figure 9:
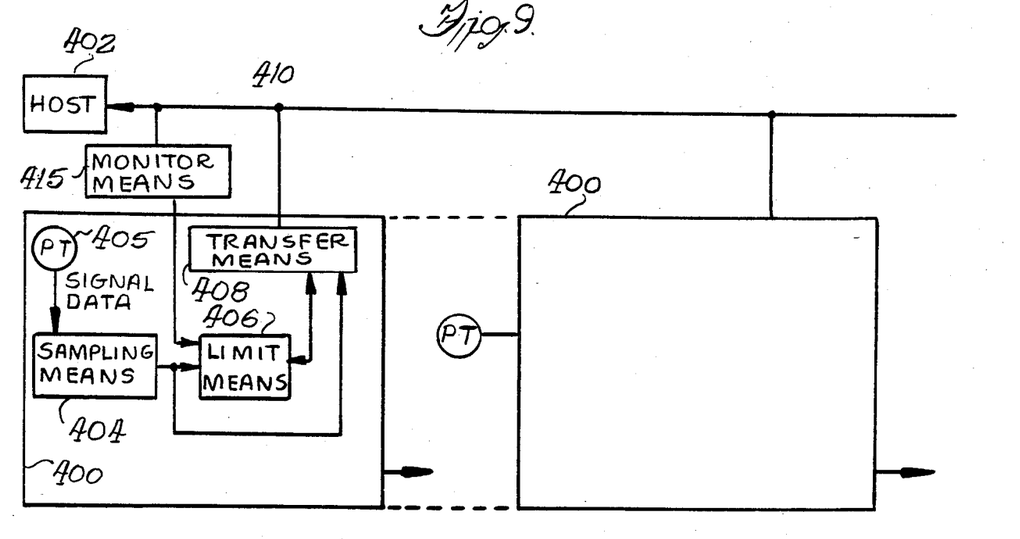
FIG. 9 is a block diagram of a heating ventilation and air conditioning system fifth embodiment of the present invention.

Referring to FIG. 9, a block diagram of a heating, ventilation, and air conditioning system illustrating a fifth embodiment of the present invention is shown as comprising a host unit 402 and at least one remote unit 400. The remote unit 400 is comprised of a sampling means 404 for sampling data at a point 405 remote to the host unit 402. The point data at 405 may be an analog or digital signal, and may represent temperature, pressure, voltage, current, or any other desired parameter. A limit means 406, coupled to the sampling means 404, determines band limits responsive to the sampled data from the sampling means 404 and responsive to a previously transmitted information signal from a transfer means 408. The transfer means 408 is coupled to the limit means 406 and to the sampling means 404, and to a communications bus 410. The transfer means 408 selectively transmits an information signal to the host unit 402, via communications bus 410, responsive to the sampling means 404 and limit means 406. In one embodiment, the information signal is output from the transfer means 408 when the sampled data signal output from sampling means 404 exceeds the band limits as determined by the limit means 406. In another embodiment, the limit means is responsive to the host unit 402 for varying the band limits. Alternatively, the remote unit may include means for adjusting the band limits responsive to a stimulus within the remote unit 400.

In yet another embodiment of FIG. 9, the system is further comprised of a monitor means 415 for determining the rate of transmission of information signals to the host unit 402 where the limit means 406 is coupled to the monitor means 415, and is responsive thereto for adjusting the value of the band limits. In a preferred embodiment, the monitor means 415 determines the rate of transmission of information signals to the host unit responsive to the number of times a particular remote unit is polled during a predefined time period. Thus, the band limits may be increased where the rate of transmission activity to the host unit is above a first rate of transmission threshold, and may be decreased where the rate of transmission of information signals to the host unit is below a second rate of transmission threshold.

The system of FIG. 9 may also be embodied in a process control system of any sort, not limited to heating, ventilation, and air conditioning.

Figure 10:
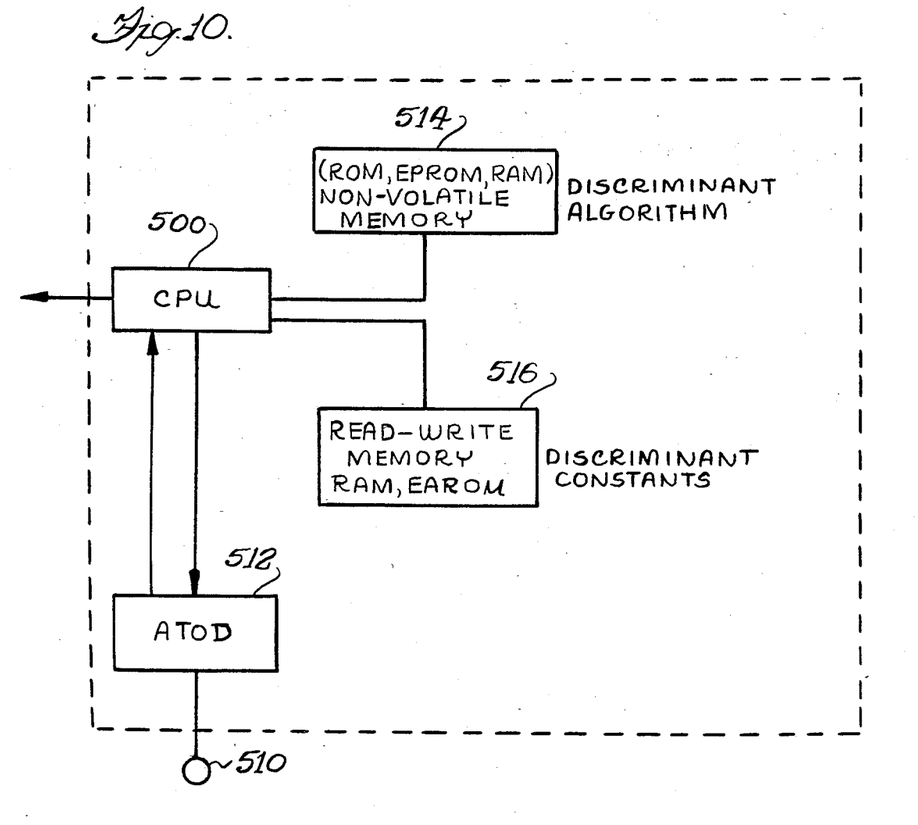
FIG. 10 is a functional electrical block diagram of a microprocessor embodiment of the present invention utilizing a CPU, ROM, RAM, and A to D converter.

Referring to FIG. 10, a functional electrical block diagram of a microprocessor based system embodiment of the present invention is shown. The system is comprised of a central processing unit 500, an analog to digital converter 512, a non-volatile memory 514, and a read write memory 516. FIG. 10 will be discussed with reference to a process control system having an analog system input coupled to point 510. A CPU 500 provides a control signal at time intervals. The CPU 500 is coupled to the A to D converter 512, read-write memory 516, and non-volatile memory 514. The A to D converter 512 provides means for converting an analog signal, as input at point 510, into a digital signal responsive to the control signal from the CPU 500. The CPU 500 provides means for converting the digital signal to an output signal, including means for selectively transmitting the output signal, responsive to a select signal. The CPU 500, in conjunction with a discriminant algorithm as stored in non-volatile memory 514, and discriminant constants as stored in read-write memory 516 (or in non-volatile memory if so desired), provides the select signal in accordance with an adaptable discriminant value. The CPU 500, and memories 514 and 516 provide means for determining a discriminant value according to the relation $B_L = (V_B - V_N)$, where $B_L =$ the discriminant band limit (the amount by which the sampled signal at input 510 must exceed the previously transmitted signal to activate transmission of the presently sampled signal), $V_B$ equals the value of a base discriminant value and $V_N$ equals the value of the new sample as input at point 510. The read-write memory 516 in conjunction with the CPU 500 provides initial values of $V_B$ and $B_L$. The CPU 500 provides the select signal in accordance with the discriminant algorithm of memory 514 when $V_B - B_L$ is greater than $V_N$ is greater than $V_B + B_L$. Thus the select signal is provided when the value of the new sample exceeds the band limits of the discriminant value. Furthermore, the CPU 500 in conjunction with the non-volatile memory 514 and read write memory 516 provides means for adjusting the value of $V_B$ such that $V_B$ equals $V_N$ when $V_B - B_L$ is greater than $V_N$ is greater than $V_B + V_L$. Thus, the base discriminant value, as well as the band limits, are adjusted after each transmission of an information signal, providing an adaptable significant change of value signal transmission system. The non-volatile memory 514 may be ROM, EPROM, or RAM, and the read-write memory 516 may be RAM, EAROM, EPROM (or ROM if read-only memory is acceptable), and the CPU 500, and memories 514 and 516 may be replaced altogether with functionally equivalent random logic circuitry. The CPU may be of any available type, such as popular commercial microprocessors (eg. Z80, 8080, 6800, 3850, TMS1000, 68000, Z8000, 8086, etc).

Figure 11A:
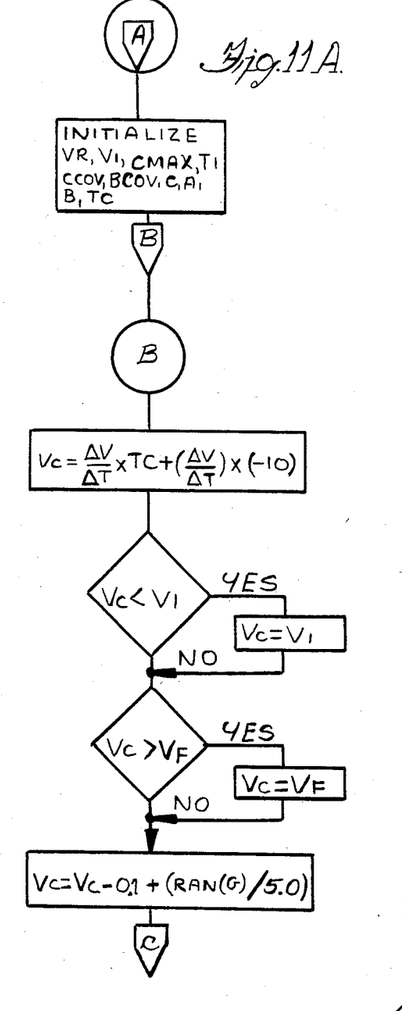
FIGS. 11a–11c are flow charts representing the logical flow and relationship which may be used to create a software or hardware embodiment of the present invention, such as in conjunction with the system shown in FIG. 10.
Figure 11B:
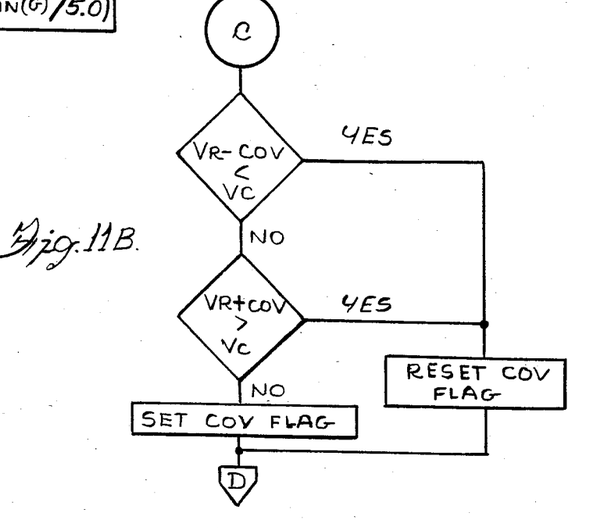
Figure 11C:
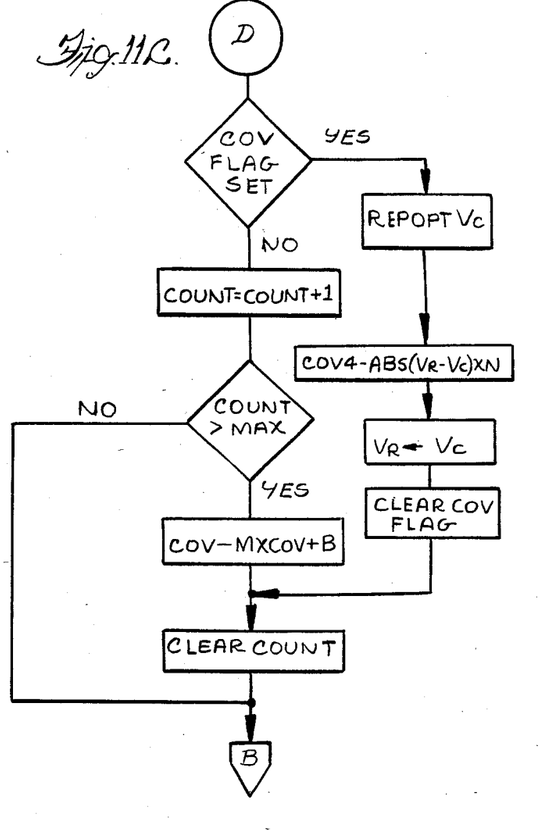

The operation of the system of FIG. 10 may be better understood by reference to the logical flow charts of FIGS. 11a–c. Referring to FIG. 11a, in step A the system initializes discriminant algorithm constants, and proceeds to step B. In step B, the current value $V_C$ ($=V_N$) is compared to the initial and final values as initialized in step A, and the current value is adjusted accordingly. Referring to FIG. 11b, in step C, the current value is compared to the last reported value ($V_R$) plus, and minus, the change of value discriminant (COV) as most recently determined. If the current value is outside the band limits of the reported value plus or minus the change of value required, a flag is set and the logical flow proceeds to step D. Referring to FIG. 11c, and step D, the change of value flag is tested. If the change of value flag has been set, the current value is reported (an information signal is transmitted), the change of value (Cov) variable is updated (adapted) to reflect the current conditions, the current value becomes the last reported value ($V_C = V_R$), the change of value flag is cleared, the count is cleared, and the logical flow proceeds to step B of FIG. 11a. If the change of value flag is not set, then a count value (C), which is initialized at zero, is incremented by one. If the count exceeds a predetermined maximum value, then the change of value band limits variable (COV) is changed (decreased) to effect a higher transmission rate compatible with the count determination that no transmissions have occurred for the maximum number of times. Once the change of value variable is changed, the count (C) is cleared, and the logical flow resumes at step B, shown in FIG. 11a. If the count does not exceed the maximum number, then the logical flow resumes at step B. The algorithm for varying the change of variable variable (COV), both in the COV flag set and COV flag not set logical flow paths, are adaptable according to user needs and wants, and system characterization. Thus, in the COV flag set logical flow path, N can equal 1, 3, or any value desired for redetermining the new value of COV. In the COV flag not set logical flow path, with the count greater than the maximum number, the value of M may equal ½ or other value desired, and the value of B can equal 0, 1, or other desired value, in the algorithm for determining the new value for COV.

Alternate systems and methods of adaptively modifying and providing a discriminant and band limits can also be employed in accordance with the teachings of the present invention. A recursive technique can be used which adaptively evaluates a small number, n, of immediately preceding (in time) samples to statistically derive variance V and standard deviation $\sigma$, from which an adaptive COV is derived. For example, $$\sigma = \sqrt{\frac{\sum_{i=1}^{i=n} \chi_i^2 - \left(\sum_{i=1}^{i=n} \chi\right)^2}{n}} \quad \text{[Equation (1)]}$$

$$V = \frac{\sum_{i=1}^{i=n} \chi_i^2 - \frac{\left(\sum_{i=1}^{i=n} \chi_i\right)^2}{n}}{n} \quad \text{[Equation (2)]}$$

$$= \frac{\sum_{i=1}^{i=n} \chi_i^2}{n} - \frac{\left(\sum_{i=1}^{i=n} \chi_i\right)^2}{n^2} = \frac{\sum_{i=1}^{i=n} \chi_i^2}{n} - (\bar{\chi})^2$$

Thus, the variance equals the average of the samples squared minus the square of the average of the samples.

The equations for $\sigma$ and V form the iterative step which is repeated for each new sample received. By keeping n small, overflow is avoided in the computation of $\Sigma\chi$ and $\Sigma\chi^2$.

In one embodiment, n is chosen as a small factor of a power of two (2), e.g. 4, 8, 16, etc. Alternatively, or additionally, overflow can be avoided by factoring (reducing) the summation values, such as $Kx\Sigma\chi_i^2$ and $Kx\Sigma\chi_i$.

Another alternative technique is to utilize the last calulated summation values to determine a new summation value, such as $$\sum_{i=1}^{i=n} \chi_{iadj.}^2 = \sum_{i=1}^{i=n} \chi_{iold}^2 - \frac{\sum_{i=1}^{i=n} \chi_{iold}^2}{n} \text{ ; and} \quad \text{[Equation (3)]}$$

-continued $$\sum_{i=1}^{i=n} \chi_{iadj.} = \sum_{i=1}^{i=n} \chi_{iold} - \frac{\sum_{i=1}^{i=n} \chi_{iold}}{n} \quad \text{[Equation (4)]}$$

For example, assume n=8, and a series of samples received so far of 5,6,5,6,5,6,5,6,. Then,

[Equation (5a-d)]

$$\sum_{i=1}^{i=8} \chi_{old} = 44 \quad \text{(a)}$$

$$\left(\sum_{i=1}^{i=8=n} \chi_{old}\right) \div n = 5.5 \quad \text{(b)}$$

$$\sum_{i=1}^{i=8} \chi_{iold}^2 = 244 \quad \text{(c)}$$

$$\left(\sum_{i=1}^{i=8=n} \chi_{iold}^2\right) \div n = 30.5 \quad \text{(d)}$$

Then, in computing new values for the first 8 samples $$V = 30.5 - (5.5)^2 = 0.25$$

$$\sigma = 0.5$$

In the preparation for a new 9th sample, adjust by reducing each term by $\frac{1}{8}$ of its average:

$$\sum_{i=1}^{i=8} \chi_{iadj}^2 = \sum_{i=1}^{i=8} \chi_{iold}^2 - \frac{\sum_{i=1}^{i=8} \chi_{iold}^2}{n} = 213.5 \quad \text{[Equation (6)]}$$

$$\sum_{i=1}^{i=8} \chi_{iadj} = \sum_{i=1}^{i=8} \chi_{iold} - \frac{\sum_{i=1}^{i=8} \chi_{iold}}{n} = 38.5 \quad \text{[Equation (7)]}$$

$$V_{adj} = \frac{\sum_{i=1}^{i=8=n} \chi_{iold}^2}{8} = \left(\frac{\sum_{i=1}^{i=8} \chi_{iold}}{8}\right)^2 = 0.25 \quad \text{[Equation (8)]}$$

$$\sigma_{adj} = \sqrt{V_{adj.}} = 0.5 \quad \text{[Equation (9)]}$$

$$\Sigma \chi_{next}^2 = \frac{(\Sigma \chi_{iadj}^2 + (\chi_{next})^2)}{n} \quad \text{[Equation (10)]}$$

$$= \frac{(213.5 + (5)^2)}{8} = 29.81$$

$$\Sigma \chi_{next} = (\Sigma \chi_{iadj} + \chi_{new})/n \quad \text{[Equation (11)]}$$

$$= (38.5 + 5)/8 = 5.43.$$

In other words, the adaptive COV is found, after receipt of a new samples $X_n$, as $$\Sigma \chi_{next}^2 = \Sigma \chi_{adj}^2 + \chi_n^2 \quad \text{[Equation (12)]}$$

$$\Sigma \chi_{next} = \Sigma \chi_{adj} + \chi_n \quad \text{[Equation (13)]}$$

$$\bar{\chi}_{next} = \frac{\Sigma \chi_{next}}{n} \quad \text{[Equation (14)]}$$

$$\overline{\chi_{next}^2} = \frac{\Sigma \chi_{next}^2}{n} \quad \text{[Equation (15)]}$$

-continued $$V_{next} = \overline{X^2_{next}} - (\overline{X_{next}})^2 \quad \text{[Equation (16)]}$$

$$\sigma_{next} = \sqrt{V_{next}} \quad \text{[Equation (17)]}$$

COV = $a \times \sigma$ next, where "a" is a preselected constant such as 1.5 or 2, or an adaptive value. [Equation (18)]

$$\Sigma X^2_{old} \leftarrow \Sigma X^2_{next} \quad \text{[Equation (19)]}$$

$$\Sigma X_{old} \leftarrow \Sigma X_{next} \quad \text{[Equation (20)]}$$

$$\overline{X}_{old} \leftarrow \overline{X}_{next} \quad \text{[Equation (21)]}$$

$$\overline{X^2}_{old} \leftarrow \overline{X^2}_{next} \quad \text{[Equation (22)]}$$

$$V_{old} \leftarrow V_{next} \quad \text{[Equation (23)]}$$

$$\sigma_{old} \leftarrow \sigma_{next} \quad \text{[Equation (24)]}$$

The total iterative procedure can be represented as follows:

(No initialization is required because the COV will quickly converge to a proper value. However, A=0, B=0 may be initialized if so desired to initialize to actual start conditions prior to the first sample only).
Step 1: Access a new sample "X".
Step 2: Define A←A+X.$^2$ ("A" is thus the running sum of the squares of the input variable X as reduced the previous running sum average)
Step 3: Define AA←A÷n
Step 4: Define B←B+x.
("B" is thus the running sum of the input variable "X" as reduced by the previous running sum average)
Step 5: Define BA←B÷n
Step 6: Define V←AA−(BA)$^2$ Step 7: Define SIG = $\sigma \leftarrow \sqrt{V}$ Step 8: Define COV←K$_1$ x SIG
Step 9: Then define A←A−AA
Step 10: and B←B−BA.
(This reduces the running sums B and A by the running sum average for each input value and value squared, respectively).
Step 11: Go to Step 1.

A signal transmission system as described herein provides a distribution means whereby the present rate of data transmission from a remote unit to a host computer may be selectively determined as a function of the previous rate of transmission from that remote unit, and may also be determined as a function of the rate of communication (bandwidth) of communication to the host unit from the remote units. Multiple means are provided for adapting change of value band limits which must be exceeded for transmission of an information signal (corresponding to the sampled data signal) to be output from a remote unit to the host unit. Additionally, means are provided for adjusting the change of value discriminant band limits as a function of the magnitude, a statistical characterization value, or a domain characterization value of the sampled data signal. Additionally, the transmitted information signal may represent a function of the sampled data signal, such as magnitude, a statistical function, or a domain function. Finally, means are illustrated and disclosed for implementing embodiments of the present invention in discrete logic circuitry, as well as a hybrid hardware/software processor based embodiment.

Although the present invention has been described in connection with specific embodiments thereof, it is to be understood that further modifications and variations may suggest itself to those skilled in the art. The scope of the present invention is not to be limited to the embodiments disclosed except as set forth in the appended claims.

What is claimed is:
1. A signal transmission system comprising:
   transmitter means for selectively transmitting at predetermined time-slots a characterization value of a data signal responsive to a control stimulus;
   adjustment means for providing a discriminant signal representing band limits, the value of the discriminant signal varying responsive to previous time-slot transmissions of said characterization value of said data signal; and
   control means coupled to said transmitter means and said adjustment means, said control means comparing a current time-slot value of said characterization value of said data signal to the value of the previously transmitted characterization value of said data signal, including means for selectively outputting said control stimulus when the differential of the compared signals is greater than said discriminant signal.
2. The system as defined in claim 1 wherein said transmitter means, said adjustment means, and said control means form a sender unit, further comprising:
   receiver means, remotely located with respect to said sender unit, for selectively receiving said characterization value of said signal.
3. The system as defined in claim 1 wherein the adjustment means is further comprised of:
   timer means for counting time intervals between the transmissions;
   for decreasing the discriminant signal value responsive to the timer means counting above a predefined threshold.
4. The system as defined in claim 2 further comprising:
   channel means for coupling the characterization value from the transmitter to the receiver; and
   means for determining the time rate of transmissions through the channel means;
   wherein the adjustment means is further comprised of:
   means for varying the discriminant signal value responsive to the means for determining.
5. The system as defined in claim 4 further comprising:
   a second sender unit, coupled to the channel means, for transmitting characterization values of second data signals,
   wherein the means for determining determines the time rate of transmissions of data signals from both the sender units through the channel means.
6. The system as defined in claim 1 wherein said characterization value is a function of the magnitude of the data signals.
7. The system as defined in claim 1 wherein said characterization is a statistical function of said data signal.

8. The system as defined in claim 6 wherein in a second mode, said characterization value is a statistical function of said data signal.

9. The system as in claim 7 or 8 wherein said statistical information is from the class of statistical information consisting of means, modes, medians, standard deviations, error squared, square root of error, root means square, and Kalman Filter statistics.

10. The system as defined in claim 1 wherein said transmitted characterization value is a frequency domain function of said data signal.

11. The system as defined in claim 6 wherein in a third mode, said transmitted characterization value is a frequency domain function of said data signal.

12. The system as defined in claim 7 wherein in a third mode, said transmitted characterization value is a frequency domain function of said data signal.

13. The system as defined in claim 8 wherein in a third mode, said transmitted characterization value is a frequency domain function of said data signal.

14. The system as defined in claim 1 wherein said characterization value is a spectral domain function of the data signal.

15. The system as defined in claim 6 wherein a in a fourth mode, said characterization value is a spectral domain function of the data signal.

16. The system as defined in claim 7 wherein in a fourth mode, said characterization value is a spectral domain function of the data signal.

17. The system as defined in claim 8 wherein in a fourth mode, said characterization value is a spectral domain function of the data signal.

18. The system as defined in claim 10 wherein in a fourth mode, said characterization value is a spectral domain function of the data signal.

19. The system as defined in claim 13 wherein in a fourth mode, said characterization value is a spectral domain function of the data signal.

20. The system as defined in claim 8 or 11 or 12 or 13 or 15 or 16 or 17 or 18 or 19 further comprising a receiver located remotely to said sending unit, wherein the receiver controls the mode of each sender unit.

21. The system as defined in claim 8 or 11 or 12 or 13 or 15 or 16 or 17 or 18 or 19 wherein said sender unit controls its own mode.

22. The system as defined in claim 21 wherein in any mode, the sending unit permutes and combines at least one data signal for transmission prior to transmittal.

23. A signal transmission system having a data signal to be sampled, comprising;
means for sampling the data signal at time intervals and providing an information signal responsive to the sampled data signal
means coupled to said sampling means for determining the differential value of a previously transmitted sampled data signal and the presently sampled data signal;
means coupled to said differential value determining means for determining a fixed band limit signal variable for each sampling of data for each time interval responsive to the previous time interval differential value; and
means coupled to said band limit signal value determining means and said differential value determining means for selectively transmitting said information signal responsive to the present time interval differential value exceeding the then existing band limit signal value.

24. The system as defined in claim 23 further comprising:
means for changing the band limit signal responsive to the rate of transmission of said information signals for a predefined time period.

25. The system as defined in claim 23 further comprising:
means for changing the band limit signal responsive to the differential value of functional characterization values of said data signals for successive time intervals.

26. The system as defined in claim 23 wherein said information signal is a function of the magnitude of the data signal for the present time interval.

27. The system as defined in claim 23 wherein said information signal is a statistical function of the data signal for the present time interval.

28. The system as defined in claim 23 wherein said information signal is a domain function of said data signal for the present time interval.

29. The system as defined in claim 28 wherein said domain function is from the group consisting of frequency, spectral, and temporal domains.

30. A system having a data signal to be sampled comprising:
means for sampling at time intevals the value of the data signal,
means for determining a fixed discriminant value variable for each sampling time interval, responsive to successive time interval sampled values and a previous time interval transmitted information signal;
means for selectively transmitting an information signal responsive to the present time interval data signal exceeding the discriminant value.

31. A multi-processing system comprising:
a plurality of remote processors,
at least one remote processor comprising:
means for time interval sampling a data signal;
means for generating a fixed discriminant signal variable for each sampling time interval, responsive to the present time interval sampled data signal and an information signal from the most recent previous time interval transmission;
means for selectively transmitting as the present time interval information signal a function of the present time interval sampled data signal responsive to said discriminant signal; and
a host processor for receiving said information signal.

32. The system as defined in claim 31 further comprising:
means for commonly coupling said information signal from each of said remote processors to said host processor.

33. The system as defined in claim 31 wherein said means for generating a discriminant signal is further comprised of:
means for comparing the magnitude values of said sampled data signals for at least two time intervals.

34. The system as defined in claim 31 further comprising:
means for comparing statistical characterization values of said data signals for at least two time intervals.

35. The system as defined in claim 33 further comprising:

means for comparing statistical characterization values of said data signals for at least two time intervals.

36. The system as defined in claim 31 further comprising:
means for comparing domain characteristic values of said sampled data signals for at least two time intervals.

37. The system as defined in claim 35 further comprising:
means for comparing domain characteristic values of said sampled data signals for at least two time intervals.

38. The system as defined in claim 37 further comprising:
means for selectively enabling the transmission of said information signal responsive to a chosen one of the means for comparing of said magnitude, statistical, and domain characterization values.

39. A signal transmission system comprising a sending unit, said sending unit including;
means for sampling a signal;
means coupled to said sampling means for providing band limits for the sampled signal;
means coupled to said band limit providing means for varying the size of the band limits responsive to a function of the signal being sampled;
means coupled to said varying means for transmitting an information signal which is a function of the sampled signal value, responsive to the band limits and the sampled signal; and
means coupled to said transmitting means for varying the transmission and sampling rates responsive to the signal being sampled.

40. The system as defined in claim 39 further comprising:
a host system means for receiving said information signal;
a plurality of said sending units;
a communications channel for transferring to said host system the transmitted signal values from each of said plurality of sending units; and
means for varying the transmission rate of certain selected ones of said sending units responsive to the rate of transmission activity on the communications channel.

41. A heating, ventilation, and air conditioning system having a host unit and at least one remote unit, said remote unit comprising:
sampling means for sampling data to a point remote to the host unit;
limit means within said remote unit for determining fixed band limits variable for each sampling of data, responsive to said sampled data and a previously transmitted information signal; and
transfer means for transmitting an information signal to the host unit responsive to the sampling means and limit means.

42. The system as defined in claim 41 wherein said limit means is responsive to said host unit.

43. The system as defined in claim 41 further comprising:
monitor means for determining the rate of transmission of information to the host unit;
wherein said limit means adjusts the value of said band limits responsive to said monitor means.

44. The system as defined in claim 43 wherein said host unit polls each remote unit, wherein said monitor means determines the rate of transmission responsive to the number of times a remote unit is polled during a predefined time period.

45. A process control system having a host unit and at least one remote unit, said remote unit comprising:
sampling means for sampling data at a point remote to the host unit;
limit means coupled to said sampling means for determining fixed band limits variable for each sampling of data, responsive to said sampled data and a previously transmitted information signal; and
transfer means coupled to said sampling means and said limit means for transmitting an information signal to the host unit responsive to the sampled data exceeding the determined band limits.

46. The system as defined in claim 41 wherein said limit means is responsive to said host unit.

47. The system as defined in claim 45 further comprising:
monitor means for determining the rate of transmission of information to the host unit;
wherein said limit means adjusts the value of said band limits responsive to said monitor means.

48. The system as defined in claim 47 wherein said host unit polls each remote unit, said monitor means determines the rate of transmission responsive to the number of times a remote unit is polled during a predefined period.

49. A process control system having analog signal inputs comprising:
means for providing a control signal at time intervals;
means coupled to said control signal providing means for converting an analog signal into a digital signal responsive to said control signal;
means coupled to said analog signal to digital signal converting means for converting said digital signal to an output signal, including means for selectively transmitting said output signal, responsive to a select signal;
means coupled to said digital signal to output signal converting means for determining a discriminant value according to the relation $B_L = |V_b - V_N|$, where $B_L$=discriminant band limit, $V_b$=value of a base discriminant value, and $V_N$=value of new sample;
means coupled to said determining means for providing an initial value of $V_b$ and $B_L$;
means coupled to determining means for outputting said select signal when $V_b - B_L \leq V_N$ and when $V_b + B^L \leq V^N$; and
means coupled to said outputting means for adjusting the value of $V_b$ such that $V_b = V_N$ when $V_b - B_L \leq V_N$ and when $V_b + B_L \leq V_N$.

* * * * *